Patented Oct. 15, 1946

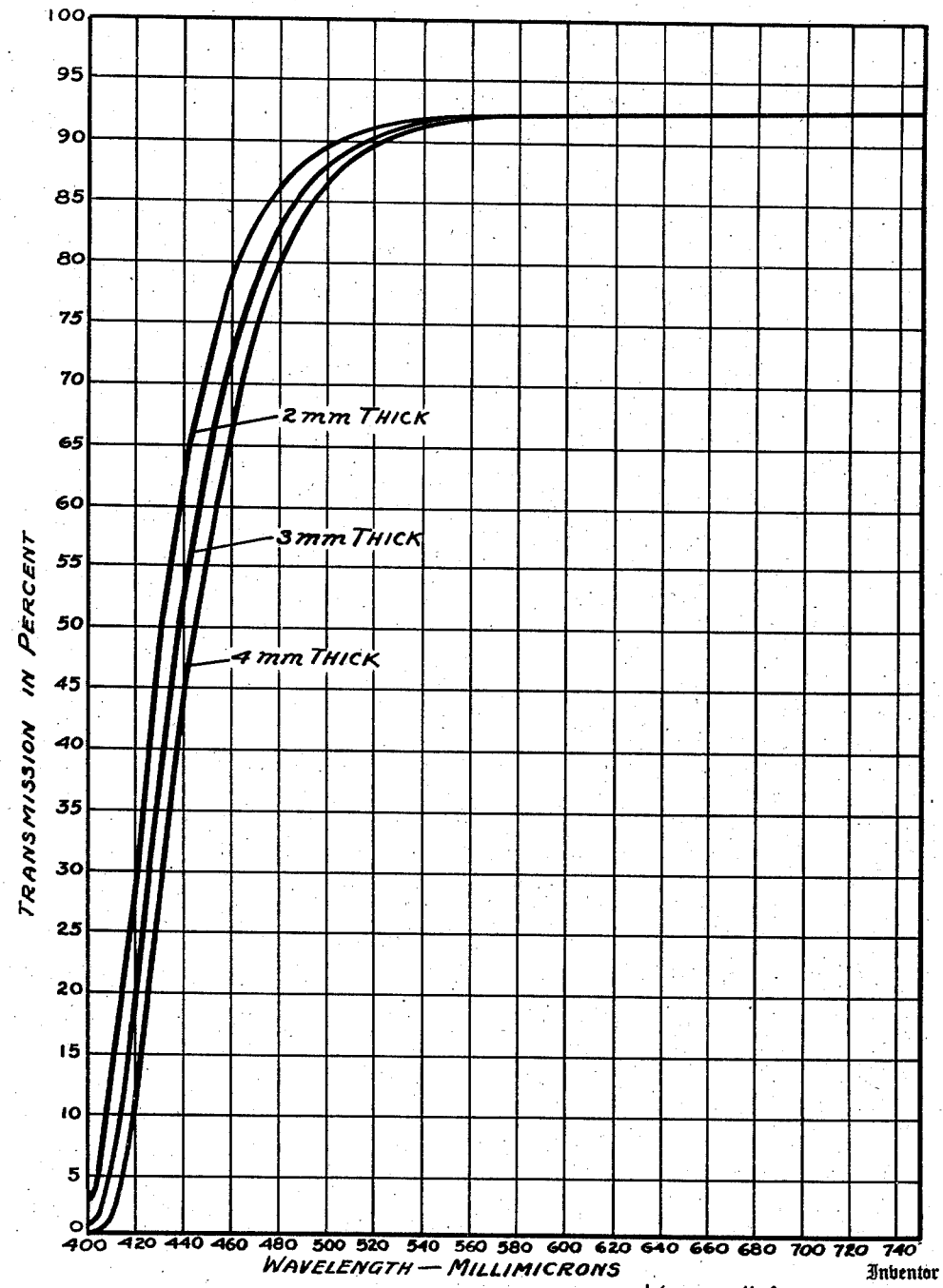

2,409,412

UNITED STATES PATENT OFFICE 2,409,412

ULTRAVIOLET ABSORBING GLASS

William H. Armistead, Jr., Corning, N. Y., assignor to Corning Glass Works, Corning, N. Y., a corporation of New York Application October 13, 1944, Serial No. 558,549

6 Claims. (Cl. 106—54)

This invention relates to glass compositions and has for its principal object to provide compositions which completely absorb ultraviolet radiations while transmitting all visible radiations longer than 405 millimicrons.

Another object is to provide a yellow glass of high visible transmission.

A further object is to modify and intensify the coloration due to iron in a borosilicate glass.

Still another object is to provide a borosilicate glass which is colored yellow by ferric chloride, bromide or iodide.

I have discovered that the above and other objects may be accomplished and that glasses having the desired properties may be produced by combining iron with chloride, bromide or iodide in high alumina borosilicate glasses containing at least 10% $Al_2O_3$ and having the ratio $Al_2O_3/R_2O$, where $R_2O$ is the total alkali metal oxide, not less than 1/1 in percent by weight.

I have found that the quality of the color, that is, the sharpness of the ultraviolet cutoff and the high visible transmission, is largely dependent upon the halide content of the finished glass, being suitable for my purpose when the halide content is at least .4% and preferably .6% or more. As is well known, the halides, when introduced into the glass, are volatilized to such an extent during melting that only very small amounts, if any, are retained in the glass. I have found that the presence of at least 10% $Al_2O_3$ causes the retention of .4% or more of the halide in borosilicate glasses. However, for reasons unknown, the bright yellow color and sharp cutoff are not obtained, even with relatively high halide contents, if the amount of alkali metal oxide in the glass exceeds the amount of alumina. As the alumina content of the glass is increased, more of the halide is retained and hence the quality of the color of the glass is improved, the alumina to alkali ratio being at least 1 as noted above. While the minimum effective amount of alumina is about 10%, the maximum amount is limited only by the increasing hardness and ultimate unmeltability of the glass.

The halides are introduced into the glass preferably as the halides or halogen compounds of the alkali metals. On account of the large volatilization losses, the percentage of halide introduced into the batch far exceeds the amount which remains in the finished glass. However, with compositions and conditions most favorable for the retention of halide it is nevertheless necessary to introduce an excess thereof into the batch in order to obtain a substantial amount in the finished glass.

Chloride produces a sharper ultraviolet cutoff than bromide and the latter is better than iodide. Fluoride, for reasons not known, has no direct effect in improving the ultraviolet cutoff of the glass but seems to improve the retention of chloride when the latter is present. Since fluoride also has a softening effect upon the glass, its presence with the chloride is advantageous for some purposes.

Glasses in which the alkali metal oxide is soda alone retain somewhat more halide than potash glasses, but potash produces a slightly brighter color than soda. Lithia is detrimental, but can be employed in limited quantities. Since the alkali metal oxide content of the glass depends upon the alumina content, as pointed out above, the maximum percentage of alkali metal oxides is limited by the meltability of the glass which becomes harder and harder as the alumina content is increased.

Relatively small amounts of iron are effective and best results are obtained with from .02% to .5% $Fe_2O_3$. With iron contents higher than this, the color changes from a bright yellow to a dull amber as a result of which the visible transmission is greatly decreased and the sharpness of the ultraviolet cutoff is lost.

Divalent oxides, such as the oxides of metals of the second periodic group, lead, etc., have an inhibiting effect on the color of the glass and its ultraviolet cutoff and even in small amounts will prevent the development of substantial color and greatly decrease the sharpness of cutoff. Consequently, the inhibiting oxides must be substantially absent from the glass.

Strong reduction of the glass, as by the use of carbon in the batch, prevents full coloration of the glass and hence should be avoided.

Melting the glass in closed pots results in a greater retention of halide in the glass.

The following compositions in percent by weight show by way of example glasses made in accordance with my invention and having a proper alumina content as compared with glasses which contain too little alumina.

|  | 1 | 2 | 3 | 4 | 5 | 6 | 7 | 8 | 9 | 10 |
|---|---|---|---|---|---|---|---|---|---|---|
|  | Percent | Percent | Percent | Percent | Percent | Percent | Percent | Percent | Percent | Percent |
| $SiO_2$ | 62.5 | 65.0 | 67.5 | 67.5 | 62.5 | 57.5 | 30.0 | 40.0 | 44.0 | 44.0 |
| $B_2O_3$ | 15.0 | 15.0 | 15.0 | 25.0 | 25.0 | 25.0 | 35.0 | 20.0 | 20.0 | 20.0 |
| $Al_2O_3$ | 10.0 | 10.0 | 10.0 | ---- | 5.0 | 10.0 | 20.0 | 20.0 | 20.0 | 20.0 |
| $Na_2O$ | 12.5 | 10.0 | 7.5 | 7.5 | 7.5 | 7.5 | ---- | ---- | 6.0 | 6.0 |
| $K_2O$ | ---- | ---- | ---- | ---- | ---- | ---- | 15.0 | 20.0 | 10.0 | 10.0 |
| $Fe_2O_3$ | .1 | .1 | .1 | .05 | .05 | .05 | .1 | .25 | .25 | .10 |
| Cl by analysis | .56 | .51 | .59 | .20 | .29 | .78 | .66 | .64 | .83 | 1.38 |
| $Al_2O_3/R_2O$ | .8 | 1.0 | 1.33 | ---- | .67 | 1.33 | 1.33 | 1.0 | 1.24 | 1.24 |
| Percent $R_2O$ added as halide | 3.0 | 3.0 | 3.0 | 4.0 | 4.0 | 4.0 | 4.0 | 5.0 | 5.0 | 5.0 |
| Percent $Na_2O$ added as $Na_2SiF_6$ | 3.0 | 3.0 | 3.0 | ---- | ---- | ---- | ---- | ---- | 6.0 | 6.0 |
|  | Dull amber, poor cutoff | Yellow, good cutoff | Bright yellow, good cutoff | No color, poor cutoff | No color, poor cutoff | Bright yellow, good cutoff | Bright yellow, good cutoff | Bright yellow, good cutoff | Bright yellow, good cutoff | Bright yellow, good cutoff |

Compositions 2, 3 and 6 to 10 are made in accordance with my invention; compositions 1, 4 and 5 are examples of glasses which are outside the scope of my invention. Considering the above compositions it will be noted that when the ratio $Al_2O_3/R_2O$ is less than 1, the color and cutoff are poor even though the chloride content is over .5% (glass 1); on the other hand, they are satisfactory when this ratio is 1 or more (glasses 2 and 3); no color is produced with .05% $Fe_2O_3$ and only .2% to .3% of chloride is retained when the alumina content is less than 10% (glasses 4 and 5); when 10% or more of $Al_2O_3$ is present and the ratio $Al_2O_3/R_2O$ equals 1 or more, the chloride content is at least .4% and the color and cutoff are good (glasses 2, 3 and 6 to 10); when the chloride content is .6% or more and the said ratio is 1 or more, the color and cutoff are particularly good (glasses 3 and 6 to 10); composition 10, which was melted in a covered pot, contains more chloride than glass 9 which has practically the same composition but was melted in an open crucible.

The spectral characteristics of the new glasses are very similar to those of the known prior glasses which are colored yellow with cadmium sulfide and which are characterized by their sharp ultraviolet cutoff and high visible transmission. However, the difficulty of controlling the color and cutoff of the prior glasses, and particularly those having an ultraviolet cutoff at 405 millimicrons, is well known. The prior glasses on that account are expensive. The color of the new glasses, on the other hand, is easy to control and is not affected by heat treatments.

The valuable spectral characteristics of the new glasses are illustrated in the accompanying drawing which shows a series of curves representing the percentage transmission of glass 10 throughout the visible spectrum in thicknesses of 2, 3 and 4 mm. It will be noted that the transmission of this glass at 405 millimicrons is substantially zero but rises very rapidly to a maximum transmission of 92% throughout the major part of the visible spectrum. Even in a thickness of 1 mm. this glass completely absorbs the mercury line at 365 millimicrons.

I claim:

1. A yellow ultraviolet absorbing glass which consists essentially of silica, boric oxide, alkali metal oxide, not less than about 10% $Al_2O_3$, from .02% to .5% $Fe_2O_3$, and which contains by analysis at least .4% of a halide having an atomic weight between 35 and 127, the ratio of alumina to alkali metal oxide being greater than one.

2. A yellow ultraviolet absorbing glass which consists essentially of silica, boric oxide, alkali metal oxide, not less than about 10% $Al_2O_3$, from .02% to .5% $Fe_2O_3$, and which contains by analysis at least .4% of chlorine, the ratio of alumina to alkali metal oxide being greater than one.

3. A yellow ultraviolet absorbing glass which consists essentially of silica, boric oxide, alkali metal oxide, not less than about 10% $Al_2O_3$, from .02% to .5% $Fe_2O_3$, and which contains by analysis at least .6% of a halide having an atomic weight between 35 and 127, the ratio of alumina to alkali metal oxide being greater than one.

4. A yellow ultraviolet absorbing glass which consists essentially of silica, boric oxide, alkali metal oxide, not less than about 10% $Al_2O_3$, from .02% to .5% $Fe_2O_3$, and which contains by analysis at least .6% of chlorine, the ratio of alumina to alkali metal oxide being greater than one.

5. A yellow ultraviolet absorbing glass which consists essentially of silica, boric oxide, alkali metal oxide, not less than about 10% $Al_2O_3$, from .02% to .5% $Fe_2O_3$, and which contains fluorine, and at least .6% of chlorine by analysis, the ratio of alumina to alkali metal oxide being greater than one.

6. A yellow ultraviolet absorbing glass which consists approximately of 44% $SiO_2$, 20% $B_2O_3$, 20% $Al_2O_3$, 16% alkali metal oxide, .1% $Fe_2O_3$, at least .6% Cl by analysis, and fluorine.

WILLIAM H. ARMISTEAD, Jr.